(12) United States Patent
Ruetenik

(10) Patent No.: US 8,220,231 B2
(45) Date of Patent: Jul. 17, 2012

(54) EQUINE BOOT

(76) Inventor: Monty Ruetenik, Clear Lake Shores, TX (US)

( * ) Notice: Subject to any disclaimer, the term of this patent is extended or adjusted under 35 U.S.C. 154(b) by 139 days.

(21) Appl. No.: 12/284,925

(22) Filed: Sep. 24, 2008

(65) Prior Publication Data

US 2009/0032270 A1    Feb. 5, 2009

Related U.S. Application Data

(63) Continuation-in-part of application No. 11/652,187, filed on Jan. 11, 2007, now Pat. No. 7,445,051.

(51) Int. Cl.
*B68C 5/00* (2006.01)
*A01L 3/00* (2006.01)

(52) U.S. Cl. ............................................. 54/82; 168/18

(58) Field of Classification Search ........ 54/82; 168/18, 168/26, 28, 14, 12
See application file for complete search history.

(56) References Cited

U.S. PATENT DOCUMENTS

| 205,159 | A | * | 6/1878 | Wemple | 168/2 |
| 519,822 | A | * | 5/1894 | Sidebotham | 168/2 |
| 646,842 | A | * | 4/1900 | König | 168/2 |
| 759,636 | A | * | 5/1904 | Ryan | 168/28 |
| 840,892 | A | * | 1/1907 | Adam | 168/1 |
| 1,043,978 | A | * | 11/1912 | St. John | 168/2 |
| 4,155,406 | A | * | 5/1979 | Hourlier | 168/18 |
| 4,444,269 | A | * | 4/1984 | Laurent | 168/1 |
| 4,513,825 | A | * | 4/1985 | Murphy | 168/12 |
| 4,736,800 | A | * | 4/1988 | Rohner | 168/18 |
| 4,744,422 | A | * | 5/1988 | Dallmer | 168/18 |
| 4,981,010 | A | * | 1/1991 | Orza et al. | 54/82 |
| 5,224,549 | A | * | 7/1993 | Lightner | 168/18 |
| 6,662,537 | B1 | * | 12/2003 | Wilson | 54/82 |
| 7,032,367 | B1 | * | 4/2006 | Yoho | 54/82 |
| 2004/0065063 | A1 | * | 4/2004 | Osha et al. | 54/82 |
| 2006/0064950 | A1 | * | 3/2006 | Ford et al. | 54/82 |
| 2007/0068125 | A1 | * | 3/2007 | Davis | 54/82 |

* cited by examiner

*Primary Examiner* — Son T Nguyen
(74) *Attorney, Agent, or Firm* — Douglas Baldwin

(57) ABSTRACT

An improved equine hoof boot, boot pad and boot and pad assembly that consists of a flexible boot and a shock absorbing pad disposed inside at the bottom of the boot, the pad having optionally a combination of soft and harder components.

15 Claims, 7 Drawing Sheets

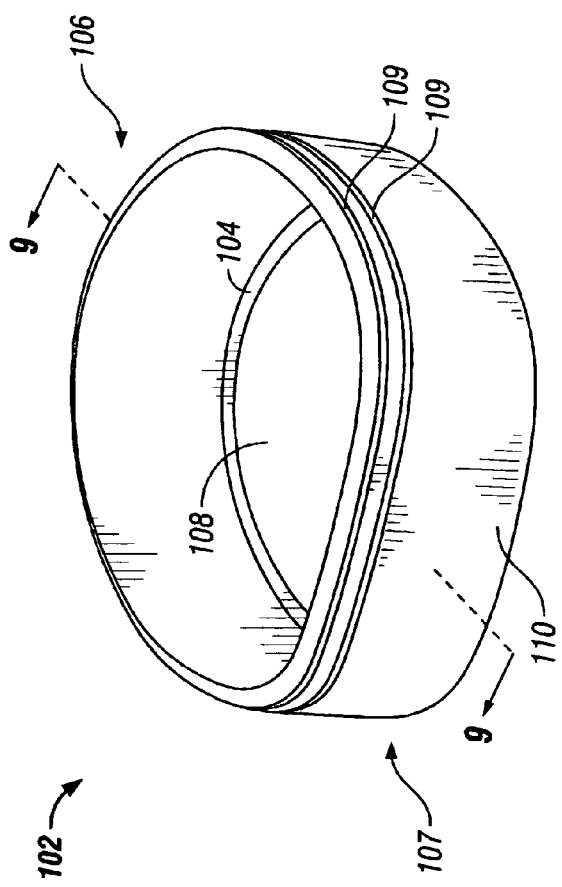
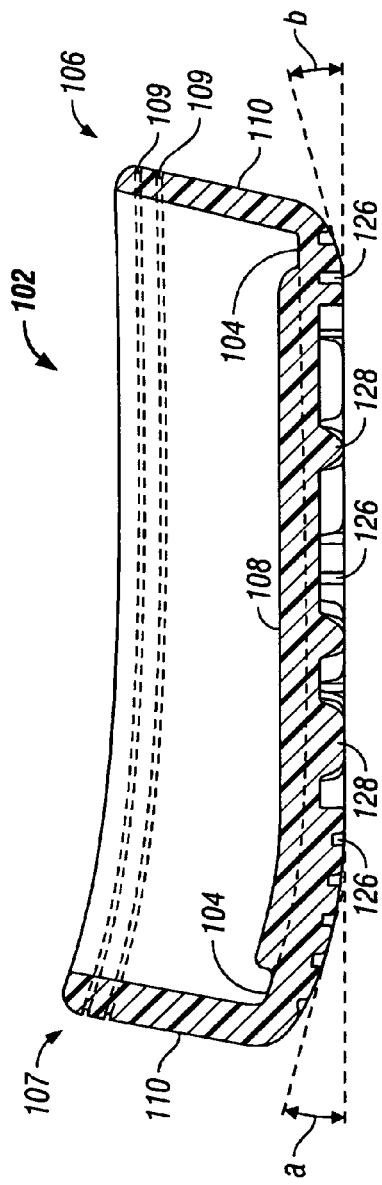

EQUINE BOOT

RELATED APPLICATIONS

This application is a continuation-in-part patent application of U.S. application Ser. No. 11/652,187, filed Jan. 11, 2007 now U.S. Pat. No. 7,445,051.

BACKGROUND

1. Field of the Invention

The present invention relates to an equine boot, boot pad and an equine boot and pad assembly for horses. More specifically, it relates to a unique boot, boot pad and a boot and pad assembly to reduce stress on the legs and tendons of animals, treat animals for hoof and leg diseases and injuries and to provide comfort and leg support.

2. Discussion

People have long attempted to protect the hoofs of animals with protective devices of various sorts. Steel or aluminum shoes have been used to protect the hoofs from damage while the animal is walking or running. In recent years many animal hoof shock absorbing pads and shoes have also been proposed. Some of these shock-adsorbing shoes consist of pads attached to the hoof by means of a more or less conventional metal shoe. Others are attached by adhesives or held in place by specially designed boots. See for example U.S. Pat. No. 4,470,466, Sep. 11, 1984, U.S. Pat. No. 4,444,269 Apr. 24, 1984, and U.S. Pat. No. 4,981,010, Jan. 1 1991. Some pads described in the patent literature are directed to the treatment of laminitis or to correct injured or anatomically incorrect hoofs. Many of the proposed pads have some means of support for the frog of the animal's hoof e.g. see U.S. Pat. No. 5,706,898, Jan. 13, 1998.

Race horses and show horses are constantly being transported and are therefore standing for long periods of time on hard and unnatural surfaces. Traveling by roadway or by air subjects the animal's legs to constant vibration and jolting putting stress on the animal's legs, tendons and joints.

Moreover, increasingly the show and competitive event arenas are using hard surface stalls and staging areas. The hard surface, asphalt, concrete, etc. make these areas easier to clean but are very hard on horses' legs and hoofs.

Horses, particularly, have injuries and diseases of the hoof that need special treatment. The present invention greatly facilitates recovery from injured hooves and from laminitis. The boot assembly of the present invention allows horses to stand and walk more comfortably and allows the hoof to be positioned properly to allow healing.

As result of trial use of certain embodiments of the previous invention, I have discovered significant and critical improvements in equine boots.

SUMMARY OF THE INVENTION

This invention is an improved equine boot, boot pad and boot assembly. The boot assembly consists of a shock absorbing pad, preferably a polymeric elastomer, and an anatomically correct boot constructed of sturdy flexible material designed to be easily fitted on the hoof of an animal. More specifically, in one embodiment the invention is an equine boot comprising an upper section made from flexible material, shaped to fit around the hoof of a horse and of a height to reach above the hoof of the horse, comprising an upper portion, comprising a front, sides, rear and bottom, wherein the front slopes back and upward, the sides are lower than the front and rear so that when the front and rear are pulled together there is an opening on each side; a fastening means at the top front and rear to fasten the front and rear together around the leg of a horse, and said bottom is attached to the front, sides and rear, and;

a molded sole plate comprising an elastomer base entirely circumscribed by a peripheral wall defining a receiving area sized to fit over the bottom of the upper section, said sole plate being securely attached to the lower circumference of the upper portion.

In another embodiment the invention is an equine boot assembly comprising:

an equine boot comprising an upper section made from flexible material, shaped to fit around the hoof of a horse and of a height to reach above the hoof of the horse, comprising a front, sides, and rear, a fastening means to fasten the front and rear together around the leg of a horse, and a bottom section made of an elastomer attached to the upper section of sufficient height and strength to constrain the deformation of an cushioning pad placed therein and compressed by the weight of a horses' hoof, and; having disposed therein at the bottom a cushioning pad.

BRIEF DESCRIPTION OF THE DRAWINGS

FIG. 8 is an isomeric view of a sole plate of the present invention.
FIG. 9 is a cut-a-way side view of a sole plate of the present invention.

DESCRIPTION OF PREFERRED EMBODIMENTS

This invention is flexible equine boot, a shock absorbing boot pad that is designed to be disposed inside and at the bottom of the boot and boot and pad assembly that comprises a flexible boot and shock absorbing pad disposed inside and at the bottom of the boot.

The Boot

In broad aspect the boot of the present invention comprises an upper portion made from flexible material shaped to fit the hoof of an animal and of a height to reach above the hoof of the animal for which it is designed. The boot has a front, sides, rear and bottom; the front slopes back and upward, the sides are lower than the front and rear so that when the front and rear are pulled together here is an opening in the sides. There is a fastening means at the top front and rear to fasten the front and rear together around the leg of a horse. In one embodiment the fastening means are straps the slope diagonally from top toward the bottom of the boot. The bottom is attached to a sole plate comprising a molded elastomer base entirely circumscribed by a peripheral wall (or sides) defining a receiving area sized to fit over the bottom of the upper portion; said sole plate being securely attached to the lower circumference of the upper portion. In one embodiment of this invention in which deep soft pads are used for therapeutic effect it, event though it is not necessary that the sole plate be located outside the fabric boot it is especially important that the bottom circumference of the boot be sufficiently strong to contain the soft pad when it is squeezed outwardly by the pressure of the horses' hoof.

Figure 1:
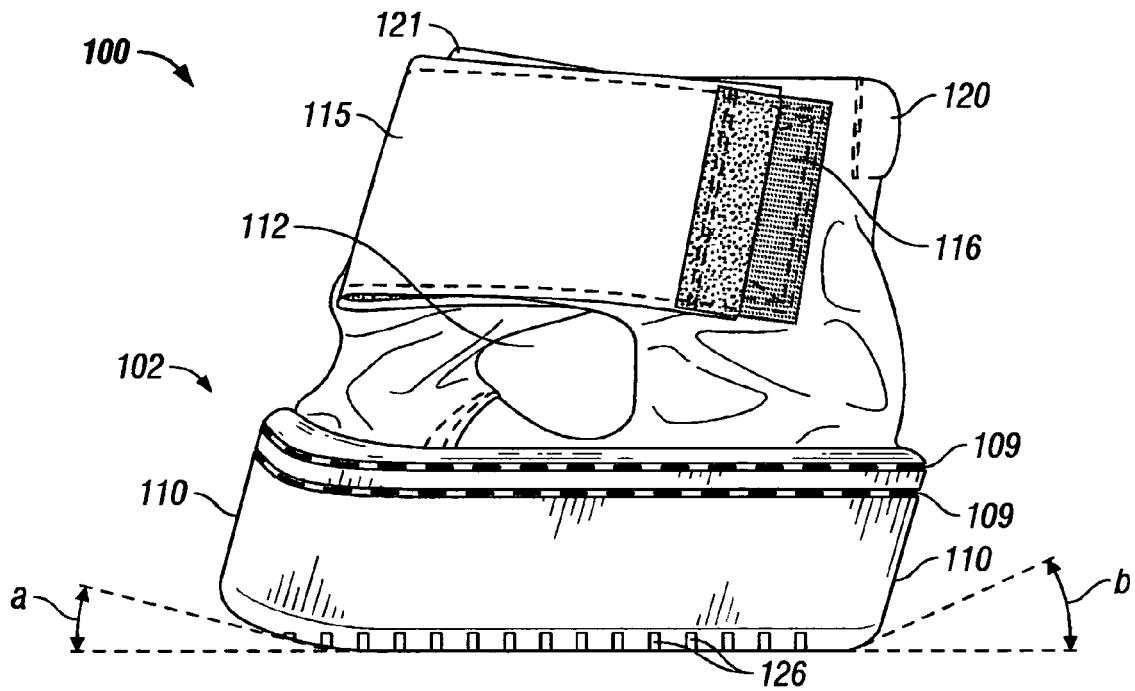
FIG. 1 is a side view of a boot of the present invention.
Figure 2:
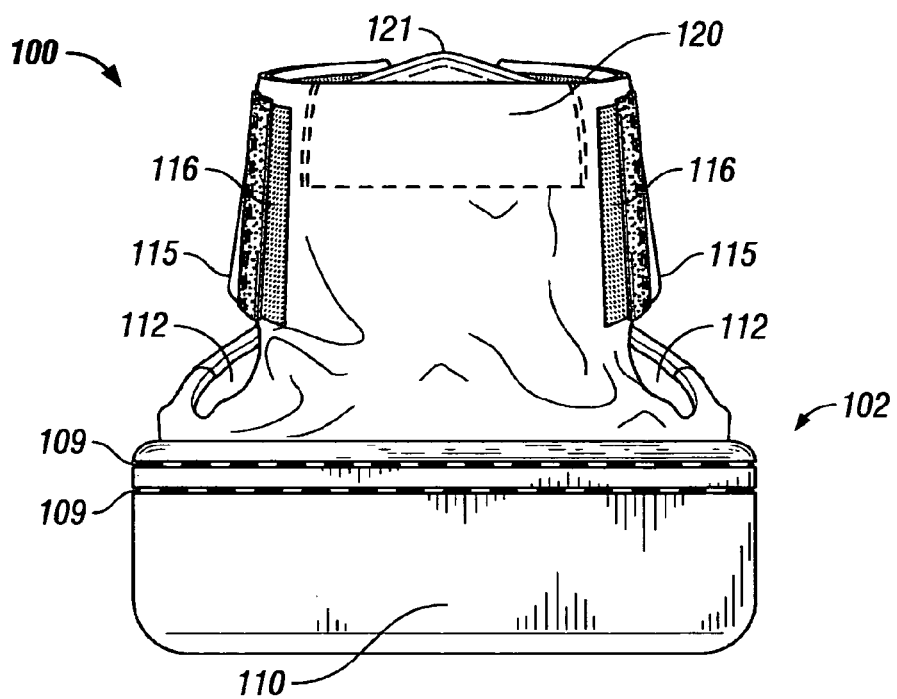
FIG. 2 is a rear view of a boot of the present invention.
Figure 5:
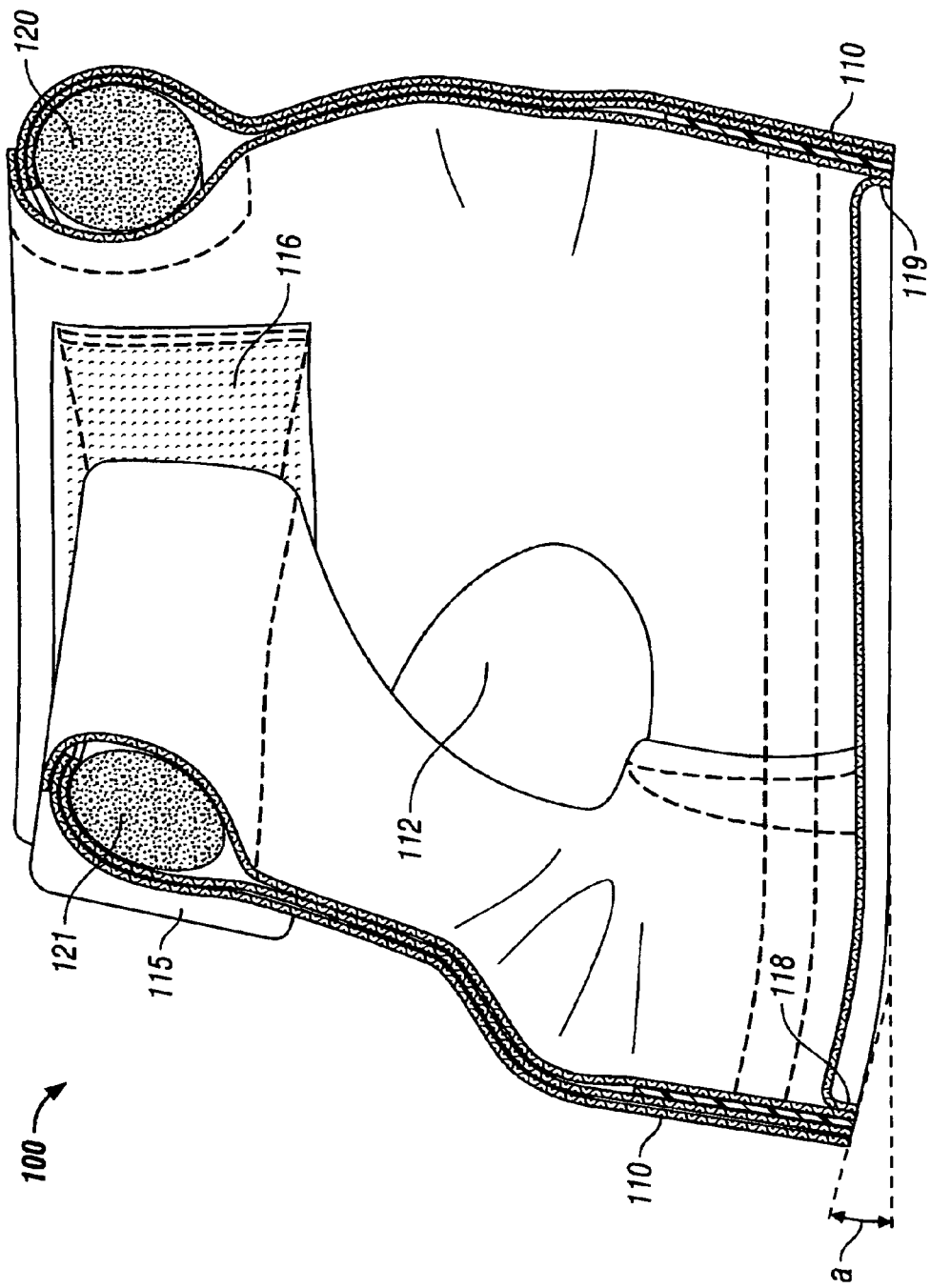
FIG. 5 is a cut-a-way side view of a boot of the present invention.

The boot is shaped to fit snugly on the hoof of an animal when fastened. FIGS. 1-3 and 5-7 depict embodiments of the invention. As seen in FIGS. 1 and 5, the boot slopes from bottom to top on the front to correspond to the slope of the animal's hoof. The angle of the slope is between 20 to 50 degrees. Preferably the angle is from 30 to 50 degrees and a 45 degree angle has been found very suitable.

The boot consists of a body, side openings (112) and closure straps (115) and (116) and sole plate (110). The size of the boot will vary according to the size of the hoof of animal on which it will be used. Generally, for horses, the boot will be sized to accommodate a four (4) to nine (9) inch diameter pad, about four (4) to ten (10) inches from front to rear. The height from sole to the top will be sufficient to clear the hoof so the boot top may be secured around the leg above the coronary band and the bulbs of the heel of the animal. The boots are from about three (3) to eight (8) inches in height. In one embodiment the rear side of the boot will be 4.5 to six (6) inches from the top to the bottom of the sole plate with the front side slightly longer (to account for the slope of the front side). There are openings (112) along each side of the boot to allow it to be opened for placing on the animal's hoof. Large openings allow the boot to be easily fitted on a horse's hoof and provide ventilation for the hoof and lower leg. These opening also allow access to the hoof for treatment. The distance of the openings from the sole will be sufficient to cover the shock-absorbing pad described below and the length of the slit will be sufficient to allow the boot to be opened to easily slip onto the hoof. For horse boots, the opening (112) on the sides will ideally start about two (2) to three (3) inches from the sole and be about three (3) to five (5) inches in width. The openings in a preferred embodiment are generally centered approximately about 90° from a point in the exact center of the front of the boot. It is preferred that the openings be at least about ¾ to 1½ inches in diameter (recognizing that the opening are not necessarily completely round) when the boot is securely strapped on the hoof of a horse. See FIGS. 1, 2 5 and 6 where the opening 112 is shown with the boot closed, as around the hoof of a horse.

In another preferred embodiment, the rear of the boot—the side opposite the sloped front—is completely covered with fabric, e.g. there are no openings in the rear of the boot from the rear of one side opening to the rear of the opposite side opening. The rear of the opening is the side away from the sloping front of the boot. This can be especially important to protect the rear of the horse's ankle and to prevent movement of a pad placed into the boot (described below).

Figure 6:
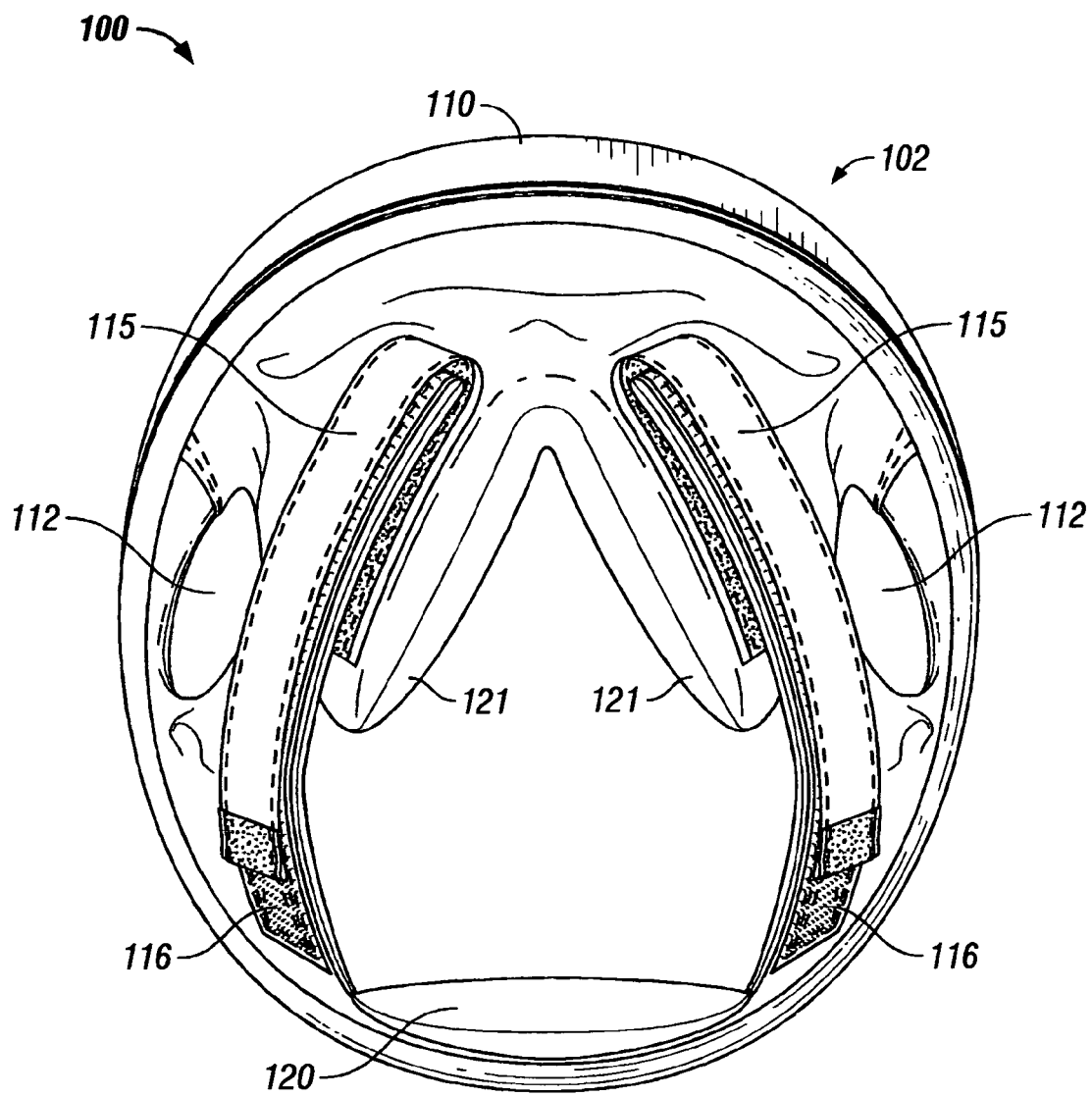
FIG. 6 is a top view of a boot of the present invention showing attachment straps in a closed position.
Figure 7:
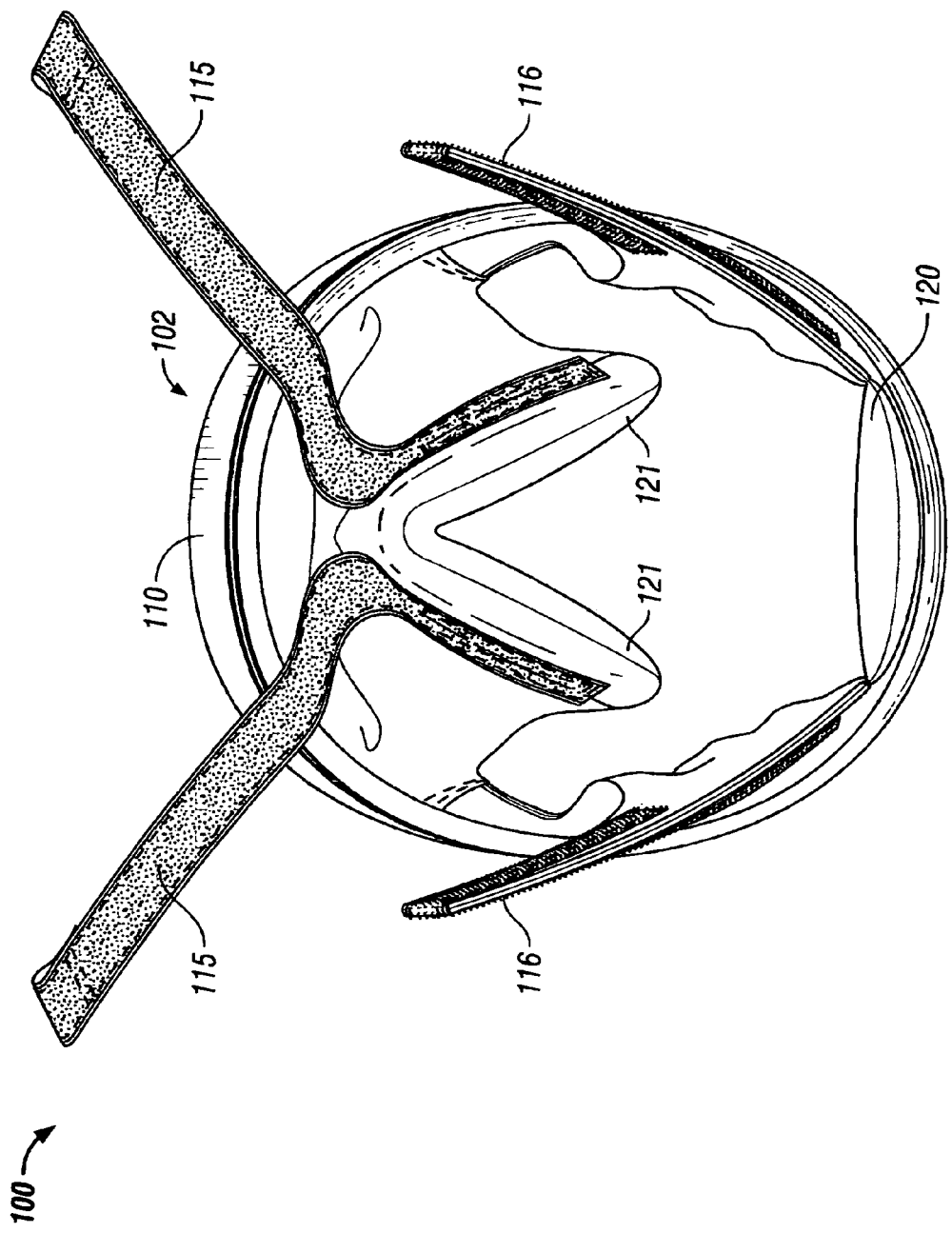
FIG. 7 is a top view of a boot of the present invention showing attachment straps in an open position.

The top of the boot is enclosed around the leg of a horse by fastening means. Suitable attaching means consists of straps, illustrated by 115 and 116 of FIGS. 1-3, and 5, that operate by connecting the straps 115 and 116 so that the opening fits snugly around the leg of the animal. The straps consist of a first set of straps attached to the rear top of the boot that are attachable to a second set of straps attached to the front top side of the boot by any convenient means. This overlap strap arrangement is easily seen in FIGS. 6 and 7 showing the first strap 115 secured to the fabric at the front of the boot overlapping strap 116 attached to the rear fabric of the boot. The attachment overlaps the front straps over the rear straps to secure the rear strap top and bottom. This gives a secure and reliable closure. In one embodiment the straps will slope downward making a V shape in the front of the boot. A suitable fastening means is for the strap attached to the front having attached to both sides one half of a loop and hook connector (for example, Velcro®) and a strap attached on the rear having connected to both sides thereto the other half of a hook and loop connector. The strap is from about one half to three (3) inches in length. The straps may also be buttoned, snapped or tied, but preferable are attached by hook and loop straps (for example Velcro®). The strap attached to the back of the boot, in one embodiment, will have an elastic strip attached to the unattached open end so that the strap may be better tightened and adjusted. Referring to FIGS. 1, 2, 6 and 7 the strap 115 will have an elastic portion on the unattached end. The elastic strap will comprise about 10% to 60% of the length of the strap.

The boot is made of any suitable flexible material, such as leather, woven or non-woven fabric or plastic sheet or mold. It has been found desirable to use a double layer of fabric as illustrated in FIG. 5, but this is not essential. A particularly suitable fabric is an 18 oz. Ballistic cloth used by the U.S. military for bags. A DuPont nylon woven fabric, CORDURA®, available in several weights, may be used. The 330 denier fabric is preferred.

When made of fabric the upper boot will have sides with a fabric bottom attached to the sides by stitching as shown in FIG. 5 (118,119). The stitching area may make a sizable ring of material at the bottom circumference of the fabric upper boot—this is easily accommodated in the present invention by a groove 104 in FIG. 8 in the sole plate.

In one embodiment there is a strip of hook and loop fastener attached to the top side of the bottom fabric of the upper fabric boot. This strip is positioned to mate with a matching strip of hook and loop fastener on the bottom side of a shock absorbing pad. When assembled the two sides of the hook and loop fasteners connect to secure the pad to the bottom of the fabric boot to prevent rotation of the pad during use. The hoof of a horse on which the boot is fitted exerts tremendous pressure and turning torque on the pad. The hook and loop attachment prevents the pad from rotating. The strips are from 0.5 to four (4) inches in length and from 0.5 to 2.5 inches in width. The matching hoop and loop fastener on the pad is secured to the pad as described below.

It is preferred that the front and rear tops of the boot at points (120) and (121) be padded. The padding is constructed by enclosing a polymeric foam, closed cell rubber pad, or other suitable resilient material, inside a pouch of fabric at the top front and rear of the boot. As shown in FIG. 5 (120,121), a round section of polymer foam padding is very suitable. Such padding may be the kind used in door insulation or expansion joints for concrete driveways or sidewalks. Any polymer foam is suitable as is cotton or synthetic fiber padding. This padding allows a closer and more secure fit around the animal's leg. The rear pad should be above the bulbs of the hoof so that the boot does not rotate. A round foam pad of about 1 inch in diameter is generally ideal. Padding of 0.5 to about 1.5 inches is desired. The padding as illustrated in FIG. 8 (120,121) is about one (1) to 2.5 inches in length. As can be seen in FIG. 5 the padding in the rear of the boot is a single pad (120) whereas the padding in the front (121) is separated by stitching; each side being about one (1) to 2.5 inches in length.

The sole plate 110 in FIGS. 1-3 and 8-9) is of special importance. The sole plate is a separate molded piece and is attached to the bottom of the fabric upper. The sole plate consists of a bottom plate (108) in FIGS. 8 and 9 and walls or sides (106 and 107) that extend upward and entirely around the circumference of the sole plate. See FIGS. 1, 2 and 9. The sole plate helps to hold the boot in position on the hoof, and if walled around the entire circumference it prevents the hoof sliding forward or rearward while in use. Moreover, the sole plate is important in confining an elastomeric pad in place. If a relatively "soft" pad is used (as is often desirable) the weight of the horse will flatten the pad and, if there were an opening in the sole plate the pad would be extruded out the opening. By having the sole plate wall entirely surrounding the circumstance the pad is held in place and will conform to the shape of the hoof—and adapt to the shape of the hoof as the horse moves. This allows the horse to find the best natural balance position—similar to the effect of having the horse stand in loose sand. The ability to achieve natural balance is especially important for horses with injured or diseased hoofs. This entire boot wall also prevents dirt and other matter getting into the bottom of the boot. The sole plate bottom is preferably about 0.375 inches to 0.65 inches thick, but may be from 0.2 to 0.75 inches in thickness. The sole plate wall (110) will extend upward 1.5 to 2.25 inches in the rear wall (107) and 1.75 to 3 inches in the front wall (106) about 0.75 inches to about 2.25 inches, measured from the bottom of the sole plate surface.

The sole plate is preferably molded of polymeric elastomer material or hard rubber (having the consistency and hardness to approximate automobile tires). Thermoplastic polyurethanes (TPUs) are suitable materials for the base plate. It is preferred that thermoplastic polyurethanes of about 55 to 75 Shore A hardness be used, with Shore A hardness of 65 to 70 being especially suitable. Other polymer materials with similar characteristics as thermoplastic polyurethanes are also usable. Choice of these will be well within the ability of those skilled in the polymer art to select.

The sole plate is attached to the bottom of the fabric boot. The attachment is preferably accomplished by either an adhesive and/or mechanical means, for example, the may be first attached by a suitable adhesive then sewn to the lower portion of the cloth boot. It has been found that two rows of stitching is especially preferred to prevent the sole from coming detached from the fabric upper during use. A double row of stitching is indicated in FIGS. 1, 2, 3 and 8 (109). Generally the sole plate will be outside the fabric boot but may in special circumstances be inside.

It is also desirable that the sole plate have a groove in the inside bottom (104 in FIG. 9). This groove allows a recess space for the seam (118 in FIG. 5) in the bottom of the upper fabric boot. The depth of this groove will depend on the size of the seam of material in the cloth upper of the boot but generally will be about 0.25 inches.

Figure 3:
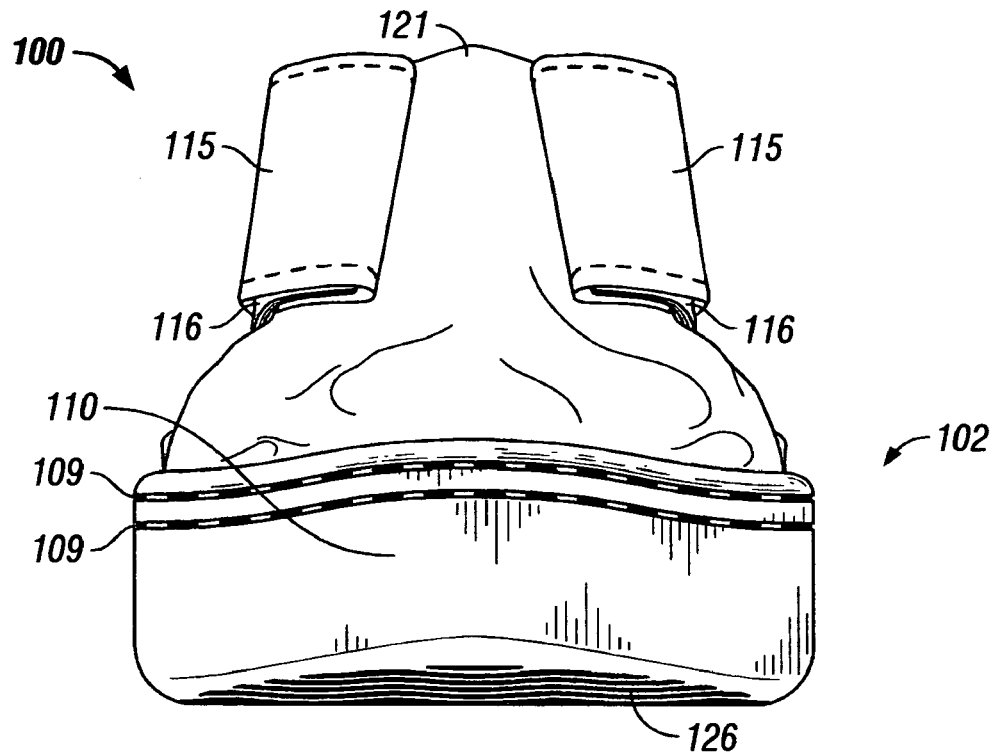
FIG. 3 is a front view of a boot of the present invention.

In a preferred embodiment the bottom of the sole plate is sloped upward in the front at an angle (a in FIG. 9) of about five (5) to thirty (30) degrees from the bottom plane as shown in FIGS. 1, 3 and 9. FIG. 9 illustrates the slope more exactly. The slope begins at a point on the bottom of the sole plate twenty (20) to forty (40) percent of the length from front to rear of the sole plate. The point of beginning is preferably about ⅓ of the distance from the front of the length of the sole plate. The edges of the sole may also be rounded as shown by angle b in FIG. 9. This angled sole plate allows the horse hoof to rock forward and backward without undue pressure on the hoof. When the horse walks the boot will "break-over" in a natural way, preventing abnormal pressure on the hoof. This rocker effect is well recognized as beneficial and there are a number of commercial products, such as the "clog" and other devises designed to "rock" with the shift in body weight of the horse allowing it to achieve a "natural balance". This can be especially important for houses with sore or damaged hoofs.

Figure 10:
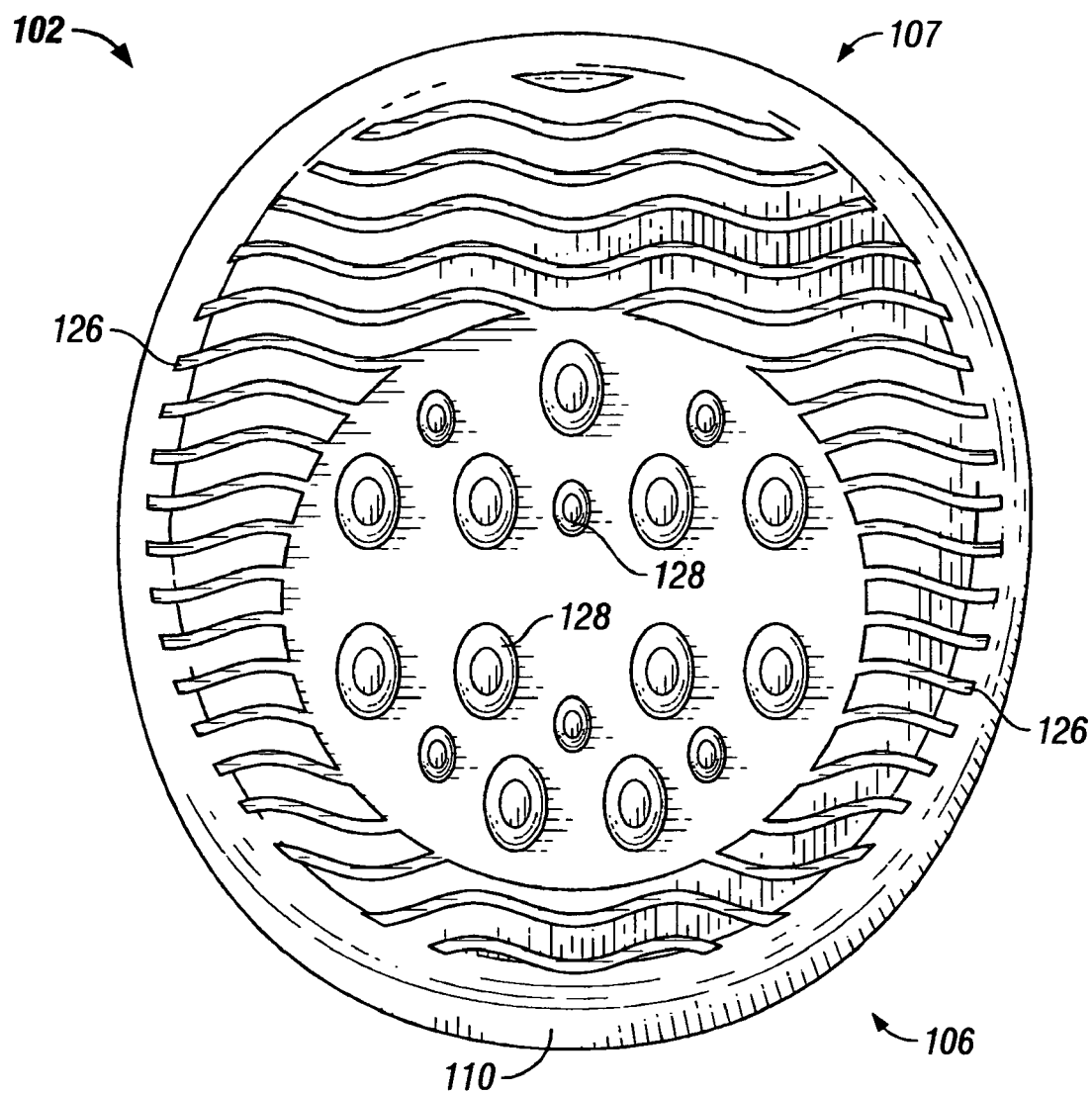
FIG. 10 is a bottom view of a sole plate.

The sole plate is preferably patterned, i.e. cleated or ridged, on the bottom. A suitable cleated design is shown in U.S. Pat. No. 7,178,321, the relevant disclosure of which is herein incorporated by reference. A very suitable patterned design for the bottom of the sole plate is shown in FIG. 10 and in Design Pat. application No. 29/266,935, filed Oct. 2, 2006, the disclosure of which is herein incorporated by reference. This design allows for excellent traction by the slanted ridges (126 in FIG. 9) on the front and rear of the sole and more flexibility in the center (128 in FIG. 9) of the sole under the section of the boot where the frog of the hoof is placed. This flexibility provides more comfort for a horse with an injured or diseased hoof. Other designs and cleat arrangement will be well within the skill on those in the art.

The Pad

Figure 4:
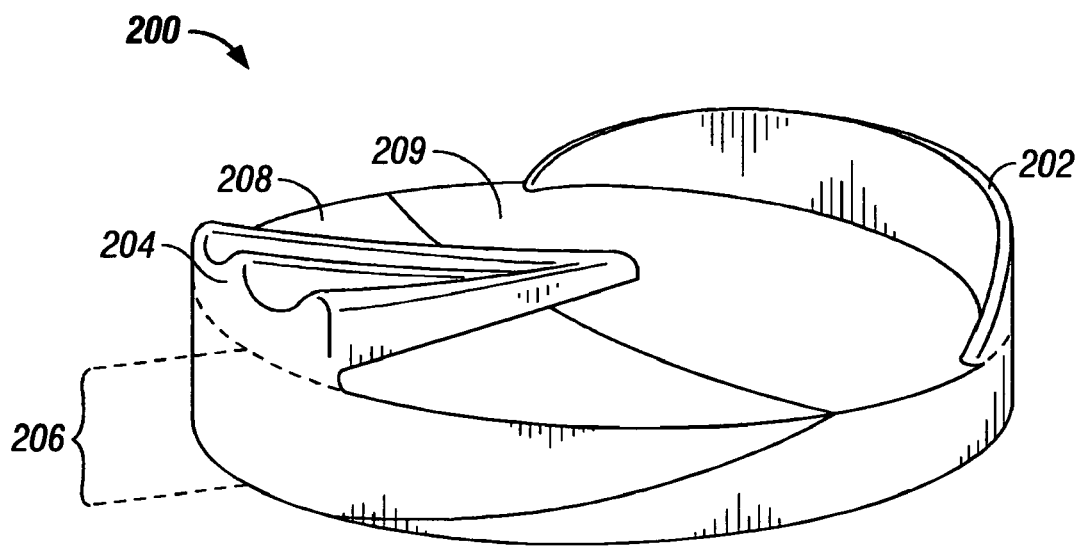
FIG. 4 is an isomeric view of a shock-absorbing hoof pad of the present invention.

Referring to the drawings, FIG. 4 illustrates an embodiment of a shock-absorbing hoof pad (200) according to the present invention. The base (206) is generally shaped to approximate the shape of the animal's hoof print. This pad, made of shock absorbing material can be easily trimmed to conform to the hoof of the individual animal on which it will be used. The base may be from about 0.25 to two (2) inches in thickness. Thickness of from about 0.25 to 0.75 inches works well with relatively hard pads. If very soft pads are used (for special purposes as explained below) the pad thickness will be greater—from about 0.75 to 2.0 inches. The rear and may be less the front to provide a sloping pad. In one embodiment, the base is tapered from back to front with the back being from about one (1) to 1.5 times the thickness of the base. In one preferred embodiment the base will be about one (1) inch thick in back and about 0.5 inch thick in front. Such a tapered base is useful for pads for horses that suffer from laminitis where it is desirable to have the hoof tilted forward to relieve separation of the laminae. See U.S. Pat. No. 5,706,898.

In one embodiment, the base (206) has a ridge that acts as a stop (202) on the front side of the base. This is to prevent the hoof from slipping too far forward. The front ridge (202) of the pad is important to prevent the front of the hoof from protruding excessively forward. This helps to keep the hoof positioned correctly over the triangular frog support, if the pad has a frog support. For pads larger than six (6) inches across, the ridge must be at least 0.60 inches above the sole of the pad. It is preferred that it be about 0.75 inches above the sole plate. For smaller pads, of less than six (6) inches across, the ridge is at least 0.375 to 0.5 inches above the sole. The front ridge should be at least 10% of the circumference of the base centered on a point in the front of the base. It may be as much as sixty (60) percent of the circumference but about twenty five (250 to thirty five (35) percent is preferred. The front ridge is preferably made from the same material as the base and may be molded as a single piece.

In one embodiment, on the backside of the base, opposite the ridge, is a frog support (204). This is a triangular projection above the surface of the base. This triangular projection is designed to approximately correspond to the shape and location of the frog of a horse's hoof. It has been found that the height of the frog support from the sole is very important to provide adequate uniform pressure as well as cushioning of the hoof. This frog support provides increased blood flow to the leg of the animal. The height at the rear of the frog support must be at least 0.5 inches from the sole for larger pads (above six (6) inches across) and at least 0.375 inches above the sole for smaller pads (up to six (6) inches across). The front of the frog support must be at least 0.15 inches above the sole of the pad and may be between 0.15 to 0.25 inches. A height of 0.175 to 0.195 inches is preferred and for many applications a height of 0.1875 inches is ideal. The height of the frog support projection above the base at the rear of the triangle in relation to the height at the front of the triangle [the small end or apex of the triangle] is in the ratio of between 2/1 to 5/1.

For, example if the height of the projection at the rear of the triangle is 0.45 inches above the surface of the pad and the height at the apex of the triangle is 0.15 inches, the ratio is 3/1.

The function of the triangle projection is to contact the frog during use, to provide a kind of massage to the frog of the hoof. Thus, blood circulation is stimulated and stress on the animal's legs and tendons are relieved. It is well known that the hoof frog acts somewhat as a blood pump. See for example, U.S. Pat. No. 4,981,010 where it is stated "The horny frog (58) is very elastic and acts as a shock absorber and as a second heart to the horse. As the hoof is pressed against the ground, old blood is forced up and out of the foot. When the hoof is lifted off the ground, the elastic frog (58) springs back, letting new blood into the foot." The frog support aids in this blood circulation.

The frog support may be concentric triangles, as shown in FIG. 4, or may be a single triangle. With two or more concentric triangles the support may be made of the same material as the base and may be molded as a single piece, but it may also be made of a material of different hardness, preferable softer. The support may be molded together with the base, thus avoiding a separate step of adhering it to the base. If the support is not molded of the same material as the base or molded to the base, it is attached to the base by a suitable adhesive such as an epoxy or polyurethane adhesive. A suitable means of attaching the softer frog support is to mold the support to the harder base before the base material is fully cured. For example, the base is poured into a mold and allowed to partially set then the frog support projection is poured into a second mold appropriately placed on top of the partially cured base, allowing the parts to bond together. Other suitable means and variations will be apparent to those skilled in the art. In other embodiments, the pad will not have the triangular projection or the front. When used with a horse that has an abscessed or injured frog it may be desirable to use a pad without the frog support. Also the improved sole plate of the boot makes it is possible to eliminate the front ridge for some applications. However, even without the frog support the front ridge projection is often useful, especially for a horse with a severely injured or damaged hoof. At times it is necessary to resection (remove the front hard hoof surface) a horses hoof if it is damaged or diseased. Such is the case with advanced laminitis. In such cases the soft front support ridge provides extra comfort to the hoof, especially if the pad is wedged shaped (sloped) in a way that forces the front of the hoof downward. It is the burden of the pad base to supply the bulk of the support for the animal. The frog support is an aid to stimulation of the frog and is not the principal means of supporting the hoof. In this way, the present invention differs from previous frog support shoes or pads. An advantage of the relative large and soft support of the present invention is that it enables the horse to adjust the position of its hoof to the most comfortable position, much like it could do if standing in a bed of sand.

It has been found that the shape of the pad is of special importance. Round pads have been found to not perform well in actual use; they tend to rotate in the boot. An elliptical shaped pad is required to maintain consistent fit and to prevent rotation in the shoe in use. The base of the pad is made of any suitable elastomeric polymer material that provides flexibility, shock absorbency, some degree of elasticity, resilience and has dimensional stability. Polyvinyl chloride PVC, polysilicone and similar elastomers are also suitable. In a preferred embodiment, the base is constructed of a cast polyurethane elastomer. For example polyurethane-casting elastomer having a Shore A hardness of from about 10 to about 70 is suitable. It is preferred that the base be of about 20 to 70 Shore A hardness and the support be of about 8 to 50 Shore A hardness. In one embodiment, very soft pads are desirable. These should be thicker than harder pads and will have a Shore 00 hardness of about 5 to 70.

One material used in an embodiment of the invention is GTS-10 to GTS-40, a urethane casting elastomer available from Win-Tech Products Corp. P.O. Box 1114, Tomball, Tex., 77377.

In another important embodiment the base of the pad is made of two components of different densities or hardness, herein referred to a duel density pad illustrated in FIG. 4 (208,209). This pad has base comprising a front component of shock absorbing material of lower hardness than a rear component, the front component comprising the forward 20 to 40 percent of the length from front to rear of the pad and the rear component comprising 20 to 40 percent of the length of the base from front to rear, wherein the two components overlap in the center of the base that is not occupied solely by the front or rear component. A very useful pad is made with the front component comprising about ⅓ of the length, the rear component ⅓ of the rear and ⅓ overlap.

A very suitable duel density pad will be made of a polyurethane elastomer; the front component (209) having a Shore A hardness of less than twenty (20) and the rear component (208) having a Shore A hardness of between 20 and 40. More desirability the front has a Shore A of 5 or less, and the rear component a Shore A of about 28-32. As with the single density pad, there is also a need for pads having softer front components —Shore 00 of 5 to about 70. Elastomers, such as polyurethane elastomers, can be formulated in wide range of rebound resiliencies. For the pads of this invention it is preferred that the pad material have low rebound resiliency, generally lower that twenty five (25) percent, and more desirably between two (2) and ten (10) percent.

It is also desirable to attach a hook and loop strap to the underside of the pad to mate with a matching hook and loop strap on the bottom fabric of the upper boot. When the mating straps are connected it prevents the pad from rotating in the boot during use of a horse. It is often difficult to secure a hook and loop the elastomer pad. It has been found that the strap can be strongly secured if the loop side, and one having loops on both sides of the strap, of the hook and loop fastener is coated with uncured polyurethane polymer and pressed into the uncured base of the pad, before it cures and sets. When set the fastener straps are securely attached.

The Boot/Pad Assembly

The equine boot assembly of this invention comprises a boot as described above having disposed inside and at the bottom of the boot a cushioning pad. The pad may be any suitable cushioning material such as cotton wool, any kind of foam and other cushioning materials that will be apparent to those skilled in the art. Suitable cushioning pads will be of sufficient thickness to provide some support to the hoof of a horse fitted with the boot. A very suitable and preferred pad will be one of those described above. When applicable, the triangular projection on the top of the pad is upward so as to contact the frog of the horse onto which the boot assembly is fitted. It is desirable that the pad be attached to the bottom fabric as described above.

In a special therapeutic boot assembly the pad will be a soft and deep elastomer, Shore 00 of 5 to 60, and of about 0.50 to 2.0 inches thick. It may or may not be sloping towards the front. This deep soft pad is especially useful where the hoof is damaged or diseased. It is also very beneficial where the horse will be standing on a hard surface for an extended time or when traveling. As explained above, the soft pad will conform to the shape of the hoof and reshape itself as the horse shifts its weight since the pad is soft and pliable and constrained by the wall of the boot, e.g. the sole plate wall. The soft pads should extend to the edges of the inside bottom of the boot in order to give support to the hoof walls. Any suitable boot that has a sufficiently strong bottom section to contain the soft pad when the pad is compressed is suitable in an assembly with the soft deep pads. The pads may be single density or duel density as described above. In a dual density pad the front and rear section will have Shore 00 hardness between 5 and 70, but will be different front and rear. For example, a duel density pad may have a front section of Shore 00 hardness of 30 and a rear section hardness of 60 Shore 00. Or, conversely, it may have a front section hardness of 50 and a rear section hardness of 20 Shore 00. The choice of hardness and the arrangement in the duel density pad is determined by what is to be accomplished. For example, if it is desirable to have the hoof tip or lean forward then a softer front section would be indicated. The principle importance of the soft deep pad is that it lets the horse seek the most comfortable position for the hoof and thus minimize stress and damage. Moreover, it provides additional rocker effect—the hoof can rack back and forth in the soft pad material—to allow the horse to achieve more natural balance. Coupled with a boot with a rocker sole plate, as described above, the deep soft pad provides double action rocker ability and has been found to be especially efficacious in horses with damaged hoofs—as with laminitis. This, allows the horse to find the most comfortable and most healing position—that is, a position that minimizes damage to the hoof. The beneficial effects of a natural balance in the horse's stance are widely recognized in horse therapeutics.

Boot Assembly Kit

In one embodiment this invention is a kit comprising a fabric boot as described above and a pad, as described above, specially adapted for use in the boot. The advantage of the kit is that the parts may be sold separately as original equipment or as replacement. For example if the boot or the pad wear out before the other, the appropriate kit part may be obtained without the necessity of purchasing the entire assembly. Also the kit may comprise a boot and a variety of specially adapted pads. For example, there may be pads with varied heights of the frog support projections.

Use of the Boot Assembly

In operation, a suitable size and style pad is inserted into a suitable sized boot and slipped on the hoof of the animal. In some cases it may be desirable to have the pad attached to the inside base of the boot. Attachment maybe made permanent as with an adhesive, but it is preferred that the pad be removable. A suitable removable attachment is made by adhering hook and loop (e.g. Velcro®) fabric (hook to one and loop to the other) the inside bottom of the boot and to the underside of the pad. A Velcro® attachment has been found to work well in practice.

The boot assemblies are particularly suitable for use on animals during transport, but because they are carefully matched to the individual animal and securely attached, they may also be used in many other applications. The animal to be transported is fitted with a boot assembly according to the disclosure herein and transported, by truck, by train or by airplane. It has been found that animal transported with a suitable boot assembly as described herein suffer far less stress and arrive more rested and in better condition than those transported otherwise.

The boot assemblies of this invention are valuable for use with injured hooves and for use on animals that are confined to small places with hard surfaces.

An additional and important application of the present invention is in the elimination of rotational torque on the leg ligaments, usually associated with exercising a horse on a standard small diameter walker. The elliptical shape of the pad, as well as the secure attachment of the pad to the bottom of the boot eliminates turning of the pad. The design on the boot was accomplished by observing the legs of horses when exercising on a "merry-go-round" walker. Most horsemen have found the use of a traditional merry-go-round type of walker, as an effective economical way to exercise and or cool horses after a workout. The pad of this invention, having a soft sub-surface, absorbs some of the rotational torque that normally would be stressing the anatomical structures of the horses' leg. This is especially beneficial after a workout when the horse is already fatigued. The standard insert pad on a regular horseshoe, is too thick and breaks nails out of the hoof, hence dislodging the shoe. The patterned or cleated bottom of the present invention provides a safety surface (or solid footing) for the foot. The patterned bottom reduces slippage, which is especially important on physically fatigued equine ligaments and tendons after exercise and after a workout. Many other uses will occur to those skilled in the art, as will variations in materials and configuration, all within the scope of the present invention.

The benefits and use of deep soft pads are described above.

Treatment of Laminitis

In one embodiment the invention is a method for treatment of laminitis in horses. Laminitis in horses, as well as treatment options, including hoof frog support is well described in U.S. Pat. No. 5,706,898. The description and treatment options for laminitis of U.S. Pat. No. 5,706,898 are incorporated herein by reference. The method of the present invention comprises fitting a horse suffering with laminitis with a boot assembly as described above for sufficient time to reduce inflammation and keep pressure on the sole and frog of the hoof. For example, a horse suffering with laminitis may have a boot assembly, as described above, placed on him for a few hours each day. It is preferred to use a pad that is tapered from back to front. For example, the base will be about one (1) inch thick in back and about 0.5 inch thick in front. It is also useful to start a horse with laminitis with a relatively soft pad or a duel density pad as described above, then as the hoof heals, to progress to harder pads. The deep soft pads are especially useful for laminitis treatment.

The invention described herein may be embodied in other specific forms without departing from the spirit or essential characteristics thereof. The present embodiments are considered in all respects as illustrative and are not restrictive, the scope of the invention being indicated by the appended claims, and all the changes that come within the meaning and range of equivalency of the claims are intended to be embraced therein.

The invention claimed is:

1. An equine boot comprising an upper section made from fabric shaped to fit around the hoof of a horse and of a height to reach above the hoof of the horse, comprising an upper portion, comprising a front, sides, rear and bottom that is attached to said front, sides and rear, wherein the front slopes back and upward, the sides are separated with a slit so that when the front and rear are pulled together there is an opening on each side; a fastening means at the top front and rear to fasten the front and rear together around the leg of a horse, and said bottom is attached to the front, sides and rear, and; a molded sole plate comprising an elastomer base entirely circumscribed by a peripheral wall defining a receiving area sized to fit over the bottom of the upper section providing a horizontal constraint for a deformable pad that may be placed inside said boot, said sole plate fitted over the bottom of the upper section and being securely attached to the lower circumference of the upper portion and wherein the bottom of the sole plate is sloped upward in the front at an angle of about five (5) to thirty (30) degrees from the bottom plane to allow the boot sole to rock forward when in use.

2. The equine boot of claim 1 wherein the rear of the upper portion is entirely enclosed and the walls of said molded sole plate is of sufficient height and strength to prevent horizontal deformation of a shock absorbing deformable pad under the pressure of a horses weight when such pad is placed in the bottom of the inside of the boot.

3. The equine boot of claim 1 wherein said openings on each side of the upper portion are at least ¾ inch in diameter when the boot is strapped closed.

4. The equine boot of claim 3 wherein said openings are at least one inch in diameter when the boot is strapped closed.

5. The equine boot of claim 1 wherein the fastening means of the upper portion are straps that overlap when closed comprising a first set comprising two straps attached to the front of the upper portion, and a second set attached to the rear of the upper portion in such a way that when closed the first strap of the set overlaps the second strap of the set.

6. The equine boot of claim 5 wherein each of the straps of the first set has an end portion of an stretchable elastic material.

7. The equine boot of claim 5 wherein the straps attached to the front of the upper section attached to both sides thereto one half of a fabric loop and hook connector and straps attached on the rear having connected to both sides thereto the other half of a fabric hook and loop connector, said strap being from about one half to three inches in width.

8. The equine boot of claim 1 wherein the sole plate is made of an elastomer material having a Shore A hardness of between 55 and 75.

9. The equine boot of claim 1 wherein the bottom of the sole plate has a patterned bottom side and is sloped upward in the front at an angle of about five (5) to thirty (30) degrees from the bottom plane to allow the boot sole to rock forward when in use.

10. The equine boot of claim 1 wherein the slope begins at a point on the bottom of the sole plate twenty (20) to forty (40) percent of the length from front to rear of the sole plate.

11. The equine boot of claim 1 wherein the front and rear of the sole plate is sloped upward at an angle of from about five (5) to thirty (30) degrees from the bottom plane.

12. The equine boot of claim 1 wherein there is disposed at the top of the upper portion on the front and rear a padding means.

13. A method of treating laminitis in an affected horse comprising;
providing an equine boot comprising an upper section made from fabric shaped to fit around the hoof of a horse and of a height to reach above the hoof of the horse, comprising an upper portion, comprising a front, sides, rear and bottom that is attached to said front, sides and rear, wherein the front slopes back and upward, the sides are separated with a slit so that when the front and rear are pulled together there is an opening on each side; a fastening means at the top front and rear to fasten the front and rear together around the leg of a horse, and said bottom is attached to the front, sides and rear, and; a molded sole plate comprising an elastomer base entirely circumscribed by a peripheral wall defining a receiving area sized to fit over the bottom of the upper section providing a horizontal constraint for a deformable pad that may be placed inside said boot, said sole plate fitted over the bottom of the upper section and being securely attached to the lower circumference of the upper portion and wherein the bottom of the sole plate is sloped upward in the front at an angle of about five (5) to thirty (30) degrees from the bottom plane to allow the boot sole to rock forward when in use; and fitting a horse suffering with laminitis with said equine boot.

14. The method of claim 13 wherein the pad is made of an elastomeric material and is tapered from front to back to form a sloping pad to force the hoof forward and down.

15. The method of claim 13 wherein the pad a duel density pad made of an elastomeric material.

* * * * *